Patented Feb. 8, 1949

2,461,498

UNITED STATES PATENT OFFICE

2,461,498

PREPARATION OF SYMMETRICAL TRIAMINOBENZENE COMPOUNDS

John Krueger, Chicago, Ill., assignor to The Edwal Laboratories, Inc., Chicago, Ill.

No Drawing. Application December 8, 1943, Serial No. 513,464

7 Claims. (Cl. 260—580)

My invention relates to the preparation of symmetrical triaminobenzene compounds.

The reduction of symmetrical trinitrobenzene compounds such as, for example, symmetrical trinitrobenzene and 2,4,6-trinitrobenzene acid by means of tin and hydrochloric acid has heretofore been described, particularly as a part of or preliminary step in the production of symmetrical trihydroxy aromatic compounds such as phloroglucinol, 2-methyl phloroglucinol, and the like. Thus, for example, in the production of phloroglucinol, as described by Clark and Hartmann at page 444 of their Collective Volume 1 of Organic Syntheses (1932), a modification of the method described in German Patent No. 102,358, reduction of symmetrical trinitrobenzene or 2,4,6-trinitrobenzoic acid is effected by providing a suspension thereof in concentrated hydrochloric acid and adding tin in small portions gradually so that the reaction proceeds briskly. No attempt is made to control the temperature.

Palmer and Brenke, Berichte, 29, 1346 (1896) describe the reduction of trinitrodibromotoluene with tin and hydrochloric acid, in unspecified proportions, at room temperature over a period of several days, from the reduction products of which they describe the recovery and isolation of triaminotoluene trihydrochloride.

Hein and Wagner, Berichte, 68B, 856–864 (1935) state that the reduction of 2,4,6-trinitrotoluene by means of tin and hydrochloric acid, pursuant to prior art practices, is unsatisfactory for the preparation of 2,4,6-triaminotoluene because of losses due to hydrolytic cleavage and sensitivity of the product to oxidation. Other workers in the art have reduced symmetrical trinitrobenzene compounds by means of tin and hydrochloric acid but, in substantially all instances where the conditions of the reduction reaction have been described, or which conditions were inherent in the manner in which the reduction reactions were carried out, the temperatures have been high, generally of the order of 100 degrees C. or higher.

I have found that the conditions of the reduction of symmetrical trinitrobenzene compounds with tin and hydrochloric acid, notably the acid strength and reduction temperature, very materially influence the character of the reduction products obtained and the yields thereof. Thus, for example, when symmetrical trinitrobenzene is reacted with tin and concentrated hydrochloric acid at boiling temperature, following the directions of Hepp, Ann., 215, 348 (1882) and the resulting amines precipitated as their tin double salts, their aqueous solution, freed from tin by means of hydrogen sulphide and evaporated to dryness in vacuo at room temperature, yields a mixture of hydrochlorides. The latter, I have ascertained, can, by treatment with sodium carbonate, be resolved into two bases, namely, 1,3,5-triaminobenzene and 1,3,5-diaminophenol, a very substantial proportion being said latter base.

I have also found that when a temperature of approximately 60 degrees C. to 80 degrees C., is used in carrying out the reduction of symmetrical trinitrobenzene or similar symmetrical trinitrobenzene compounds such as trinitrotoluene, with tin and strong or concentrated hydrochloric acid, particularly a large excess of such acid, the tin double salt which is obtained contains only the single base, triaminobenzene, in the form of a hydrochloride or hydrochlorides. However, when the aqueous solution of said base hydrochloride is freed from tin by means of hydrogen sulphide and then evaporated to dryness at room temperature in vacuo, pursuant to prior art procedures, the said triaminobenzene base hydrochloride is converted to a mixture of triaminobenzene hydrochloride and diaminophenol hydrochloride, the latter being present in substantial proportions.

In the recovery of the triaminobenzene trihydrochlorides from the reduction mixtures, produced as described hereinabove by workers in the art, the reduction solution was filtered or decanted from the unused tin and the tin chloride-triaminobenzene hydrochloride complex or double salt was recovered, as, for example, by precipitation with hydrochloric acid. The resulting complex or double salt was then dissolved in water and was freed from tin with hydrogen sulphide. The treatment with hydrogen sulphide caused the formation of hydrochloric acid which prevented complete precipitation of the tin sulphide. Hence, several precipitations were necessary and the solution was required to be evaporated in vacuo at low temperatures, for example, room temperature, between precipitations with the hydrogen sulphide. Such process for the recovery of the triaminobenzene hydrochlorides free from inorganic salts, particularly tin salts, as can be seen, has been exceedingly tedious and costly.

In accordance with my present invention, the disadvantages and cumbersome methods of the prior art are overcome, including the elimination of the hydrogen sulphide precipitation procedures. My invention makes readily possible the production of symmetrical triaminobenzene bases, including the hitherto unknown 1,3,5-triaminobenzene. The latter, for example, may readily be produced following the teachings of my present invention and may be recovered in the form of a white or substantially white crystalline material having a melting point of about 129 degrees C.

In order that those skilled in the art may more fully understand the nature of the present invention, the following examples are set forth as illustrative. It will be appreciated that the proportions of reacting ingredients, times of reaction, and the like may be varied, as pointed out hereafter. These and other variations and modifications will be evident to those skilled in the art in the light of the guiding principles which are disclosed herein.

Example I 1,3,5-triaminobenzene.—(a) 10 grams of symmetrical trinitrobenzene or an equivalent weight of 2,4,6-trinitrobenzoic acid (which undergoes some decarboxylation in the reaction) and 40 g. of mossy tin were added to 130 cc. of concentrated hydrochloric acid at 60–70 degrees C. The reaction mixture was maintained at such temperature for one hour. The solution was decanted from the unused tin, was chilled, and to it were added 90 cc. of concentrated hydrochloric acid. The tin double salt was filtered off and was decomposed with 100 cc. of 20% sodium carbonate solution. The tin oxide was filtered off and the filtrate was treated with gaseous hydrochloric acid to produce a precipitate comprising triaminobenzene trihydrochloride and some sodium chloride. This precipitate was triturated with 15 cc. of 20% sodium carbonate solution and 10 g. of sodium carbonate, then was sucked dry. The triaminobenzene was extracted from the solid mass by boiling it with acetone. The acetone solution, treated with C. P. hydrochloric acid, gave 4 g. (35%) of triaminobenzene hydrochloride (either a mixture of the di- and trihydrochlorides or perhaps more probably triaminobenzene trihydrochloride monohydrate). The identity of this crude product was checked by treating 2.2 g. with 16 cc. of 10% sodium carbonate solution, extracting with chloroform and evaporating the chloroform to yield 1.2 g. of triaminobenzene base of M. P. 126 degrees C.

(b) 2.5 grams of triaminobenzene hydrochloride (prepared from either trinitrobenzene or trinitrobenzoic acid), were added to 1 g. of sodium carbonate and 5.5 cc. of 20% sodium carbonate solution. The grey precipitate, consisting of base and sodium chloride, was extracted with boiling acetone. The acetone extract, concentrated and treated with a small amount of chloroform, gave long fine needles of M. P. 84° weighing 0.9 g. (61%). The base crystallized from chloroform as white leaflets and from benzene as white platelets melting at 129 degrees C.

Anal. Calcd. for $C_6H_9N_3$: C, 58.51; H, 7.37; N, 34.12. Found: C, 58.0; H, 7.2; N, 33.2.

NOTE: When the tin double salt, containing triaminobenzene as the only organic constituent, was freed from tin by the usual hydrogen sulphide method, a mixture of triaminobenzene and diaminophenol was formed. Thus 1 gram of the hydrochloride salt mixture made tin-free with hydrogen sulphide was treated with 8 cc. of 20% sodium carbonate solution and was extracted four times with 30 cc. portions of chloroform. The chloroform extracts evaporated to dryness gave 44 mgs. of crystalline triaminobenzene, which when recrystallized from benzene melted at 118 degrees C. The chloroform extracted solution crystallized to yield a mixture of sodium chloride and diaminophenol from which the latter compound, by acetone extraction, was obtained in a yield of 80 mgs. This base melted at 175 degrees C.

Example II 2,4,6-triaminotoluene.—12 grams of trinitrotoluene and 40 g. of mossy tin were added at 60–75 degrees C. to 130 cc. of concentrated hydrochloric acid. The reaction was allowed to proceed for one hour at said temperature. Unreacted tin was filtered off and the filtrate was chilled, then treated with 100 cc. of hydrochloric acid. The tin double salt which precipitated was filtered off and was treated with 135 cc. of 20% sodium carbonate solution. The tin oxide was filtered off and the filtrate was extracted fourteen times with 150 cc. of chloroform. Evaporation of the chloroform gave 4.2 g. (66%) of triaminotoluene base melting at 115 degrees C. Triaminotoluene is much more soluble in both water and chloroform than is triaminobenzene. Triaminotoluene base crystallized from benzene as clumps of flat white needles of M. P. 121 degrees C.

Anal. Calcd. for $C_7H_{11}N_3$: C, 61.28; H, 8.08; N, 30.63. Found: C, 61.4; H, 7.5; N, 29.8.

In view of the foregoing, it will be seen that I eliminate the slow and cumbersome methods of the prior art which involve the utilization of hydrogen sulphide for the separation of the triaminobenzene hydrochlorides from the tin double salts thereof. Instead, the tin is removed by means of a strong solution of an alkali carbonate, particularly sodium carbonate, the double salt of the tin and the triaminobenzene hydrochlorides being decomposed thereby. The precipitate of tin salt which results from the treatment with the alkali carbonate is then filtered off and the triaminobenzene hydrochlorides, substantially entirely free from tin, may be precipitated by means of strong hydrochloric acid, particularly, gaseous hydrochloric acid. The free triaminobenzene base may then be recovered from the triaminobenzene hydrochloride by adding it to a strong solution of an alkali carbonate followed by extraction with an organic solvent, for example, chloroform, N-butanol, or the like, and evaporation of said organic solvent. While alkalies or alkaline materials generally may be utilized in place of the alkali carbonates, I have found that the latter, particularly the alkali metal carbonates, and especially sodium carbonate, are unusually satisfactory and I make particular claim to the use thereof as an important, though limited, embodiment of my invention.

While I have described my invention in detail, it will be understood that the scope thereof is not to be limited other than as set forth in the claims.

What I claim as new and desire to protect by Letters Patent of the United States is:

1. In a method of preparing symmetrical triaminobenzene compounds, the steps which comprise reacting a mixture including tin, an excess of substantially concentrated hydrochloric acid, and a symmetrical trinitrobenzene compound selected from the group consisting of trinitrobenzene, trinitrobenzoic acid, and trinitrotoluene, the reaction being carried out, in the main, at a temperature between about 60 degrees C. and about 80 degrees C.

2. In a method of preparing symmetrical triaminobenzene bases, the steps which comprise reacting a mixture including tin, an excess of substantially concentrated hydrochloric acid, and a symmetrical trinitrobenzene compound selected from the group consisting of trinitrobenbene, trinitrobenzoic acid, and trinitrotoluene, the reaction being carried out, in the main, at a temperature between about 60 degrees C. and about 80 degrees C., filtering, adding hydrochloric acid to the cooled filtrate, filtering to separate out the resulting precipitate of tin double salt of triaminobenzene hydrochlorides, decomposing said double salt with a solution of an alkali carbonate, filtering, adding hydrochloric acid to the filtrate to precipitate triaminobenzene hydrochlorides, separating said precipitate and mixing it with a solution of an alkali carbonate, extracting the free triaminobenzene base from the reaction mass with an organic solvent, and recovering said free triaminobenzene base from said organic solvent.

3. In a method of preparing symmetrical triaminobenzene bases, the steps which comprise decomposing a tin double salt of a hydrochloride of a symmetrical triaminobenzene compound selected from the group consisting of triaminobenzene and triaminotoluene with a solution of an alkali carbonate, filtering, adding hydrochloric acid to the filtrate to precipitate a triaminobenzene hydrochloride, separating said precipitate and mixing it with a solution of an alkali metal carbonate, extracting the free triaminobenzene base from the reaction mass with an organic solvent, and recovering said free triaminobenzene base from said organic solvent.

4. In a method of preparing symmetrical triaminobenzene bases, the steps which comprise reacting a mixture including tin, an excess of substantially concentrated hydrochloric acid, and a symmetrical trinitrobenzene compound selected from the group consisting of trinitrobenzene, trinitrobenzoic acid and trinitrotoluene, the reaction being carried out, in the main, at a temperature between about 60 degrees C. and about 80 degrees C., filtering, adding substantially concentrated hydrochloric acid to the cooled filtrate, filtering to separate out the resulting precipitate of tin double salt of triaminobenzene hydrochlorides, and decomposing said double salt with an alkali to precipitate the tin.

5. In a method of preparing symmetrical triaminobenzene bases, the steps which comprise decomposing a tin double salt of a symmetrical triaminobenzene hydrochloride selected from the group consisting of triaminobenzene and triaminotoluene hydrochlorides with a solution of an alkali, filtering, and adding hydrochloric acid to the filtrate to precipitate a triaminobenzene hydrochloride.

6. In a method of preparing symmetrical triaminobenzene bases, the steps which comprise decomposing a tin double salt of a symmetrical triaminobenzene hydrochloride selected from the group consisting of triaminobenzene and triaminotoluene hydrochlorides with sodium carbonate to precipitate a tin salt, filtering, and adding hydrochloric acid to the filtrate to precipitate a triaminobenzene hydrochloride.

7. In a method of preparing symmetrical triaminobenzene bases, the steps which comprise decomposing a tin double salt of a symmetrical triaminobenzene hydrochloride selected from the group consisting of triaminobenzene and triaminotoluene hydrochlorides with an alkali to precipitate a tin salt, filtering, adding hydrochloric acid to the filtrate to precipitate a triaminobenzene hydrochloride, separating said precipitate and mixing it with an alkali to free the triaminobenzene base, extracting the free triaminobenzene base from the reaction mass with an organic solvent, and recovering said free triaminobenzene base from said organic solvent.

JOHN KRUEGER.

REFERENCES CITED

The following references are of record in the file of this patent:

UNITED STATES PATENTS

| Number | Name | Date |
|---|---|---|
| 1,492,094 | Bielouss | Apr. 29, 1924 |

FOREIGN PATENTS

| Number | Country | Date |
|---|---|---|
| 166,934 | Great Britain | July 25, 1921 |

OTHER REFERENCES

Hepp: "Ann.," vol. 215, page 348 (1882).
Gilman: "Organic Synthesis," vol. 1, pages 444–445 (1932).
Hein et al.: Berichte, vol. 68 (1935), pp. 856–863.
Beilstein: Handbuch der Organische Chemie, vol. XVI, p. 299.